May 29, 1962 A. J. THERIOT Re. 25,178

ORNAMENTAL BUTTONCOVER

Original Filed Dec. 22, 1959 2 Sheets-Sheet 1

INVENTOR
A. J. THERIOT

BY Beale & Jones

ATTORNEYS

May 29, 1962

A. J. THERIOT

Re. 25,178

ORNAMENTAL BUTTONCOVER

Original Filed Dec. 22, 1959

2 Sheets-Sheet 2

INVENTOR

A. J. THERIOT

BY Beale & Jones

ATTORNEYS

United States Patent Office

Re. 25,178
Reissued May 29, 1962

25,178

ORNAMENTAL BUTTONCOVER

Alfred J. Theriot, 6711 W. Laverne, New Orleans, La.

Original No. 2,994,980, dated Aug. 8, 1961, Ser. No. 861,416, Dec. 22, 1959. Application for reissue Nov. 16, 1961, Ser. No. 154,101
7 Claims. (Cl. 40—315)

Matter enclosed in heavy brackets [ ] appears in the original patent but forms no part of this reissue specification; matter printed in italics indicates the additions made by reissue.

This invention relates to an ornamental buttoncover. More specifically, this invention relates to a buttoncover adapted, for instance, to be slipped over a cuff button or skirt-front button in secure engagement therewith.

This application is a continuation-in-part of my earlier filed copending application, Serial No. 749,148, filed July 17, 1958, now abandoned.

It is an object of this invention to provide an ornamental buttoncover which cannot accidentally be misplaced from the button, since removal therefrom is possible by lateral pressure in one direction only.

It is a further object of this invention to provide an ornamental buttoncover having means to engage the button which means are not dependent on the button-thread for securement or positioning.

It is a still further object of this invention to provide an ornamental buttoncover having a button-receiving cage which is simple and inexpensive in construction.

This invention embodies other novel features, details of construction and arrangement of parts which are hereinafter set forth in the specification and claims and illustrated in the accompanying drawings wherein:

Briefly, the invention is an ornamental buttoncover comprising a cage having a mouth adapted to be spread to receive a button and to contract to hold the button installed in the cage. The cage also comprises stops or finger members adapted to hold the button from sliding out the side or rear thereof. The cage is mounted on the back of an ornamental cover member.

Figure 1:
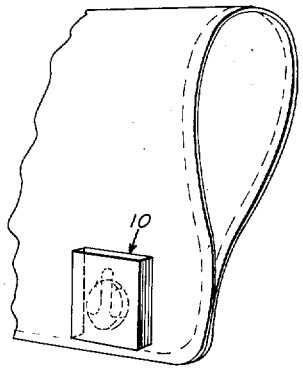
FIG. 1 is a perspective view showing an ornamental buttoncover embodying my invention and applied to a cuff button.
Figure 2:
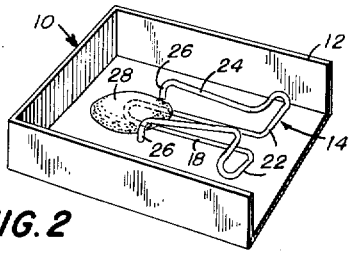
FIG. 2 is a perspective view taken from the bottom and slightly to one side.
Figure 6:
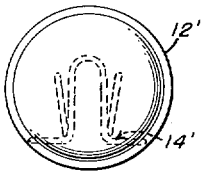
FIG. 6 is a top plan view showing the cage of the invention installed on a different cover from that shown in FIGS. 1 through 3.
Figure 7:
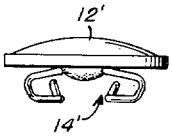
FIG. 7 is a side elevational view of the device shown in FIG. 6.

Referring to FIG. 1, a buttoncover embodying the invention is generally designated 10. It comprises an open-boxshaped cover member 12 having one side wall removed to permit lateral entrance of the button. The ornamental cover member may take various forms. An alternate cover member is shown in FIGS. 6 and 7 wherein the cover 12' comprises a disc member having no side walls thereon.

Figure 3:
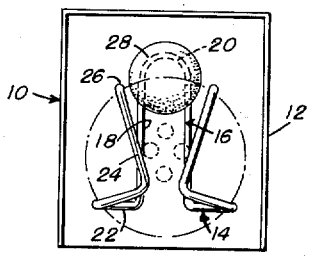
FIG. 3 is a bottom plan view.

The buttoncover according to my invention includes a resilient button-receiving cage generally designated 14 in FIG. 3. The cage comprises a U-shaped member 16 having a pair of normally substantially parallel legs 18 and a connecting bight 20. A pair of mutually confronting C-shaped jaws 22 are disposed generally in a single plane which is substantially perpendicular to that of the U-shaped member, and the lower ends of the jaws 22 are attached respectively to the outer ends of the legs 18 of the U-shaped member. The jaws form a button-receiving mouth. The upper ends of the C-shaped jaws have attached thereto respectively a pair of rearwardly and slightly outwardly extending arms 24 which are disposed in a plane substantially parallel to the plane of the U-shaped member 16. A downwardly extending stop 26 or finger is attached to the distal end of each arm.

The cage 14 is firmly attached to the ornamental cover member 12 as at 28. This may be accomplished by solder, cement, clamp means, or the like. In attachment, the U-shaped member 16 of the cage is disposed flat against the bottom surface of the ornamental cover and the attachment is made at the bight 20 of the U-shaped member. This permits the natural resilience of the entire length of the legs 18 to absorb the distortion of the cage as the mouth is spread during the installation of the button.

Figure 4:
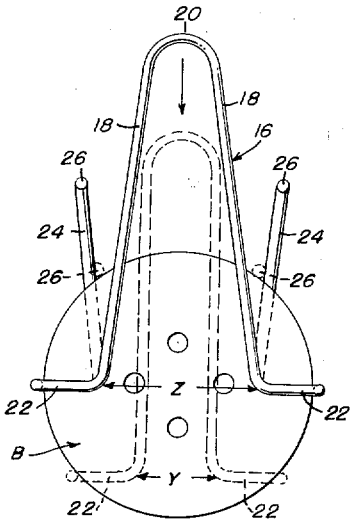
FIG. 4 is a top plan view of the cage distorted and receiving a button and showing in broken lines the undistorted shape of the cage.
Figure 5:
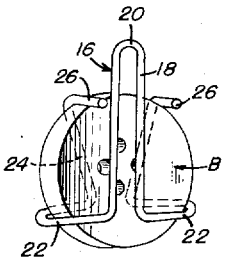
FIG. 5 is a perspective view of the cage having a button installed therein.

The steps of installation or removal of the button with respect to the cage are shown in FIG. 4. The broken lines outline the normal configuration of the cage. Normally the ends of the C-shaped jaws 22 are disposed a distance Y apart. During the installation or the removal of the button B, however, as shown in full lines, the jaws 22 of the cage are spread by the button so that the ends of the C-shaped jaws 22 are a greater distance Z apart. As is shown clearly in FIG. 4, the distortion of the cage thus is accommodated largely by the native resilience of the legs 18. FIG. 5 shows a button completely installed in the cage wherein the rear edge of the button abuts the stops or fingers 26 depending from the distal ends of the arms, and the forward edge of the button abuts the jaws 22. As shown in FIGS. 4 and 5, the apertures in the center of the button through which the buttonthread passes are located between the arms 24 of the cage and there is no dependence on the buttonthread for positioning of the cage. Hence, there is no stress on the buttonthread.

To accommodate buttons of various sizes and heights, the cage may be made in various sizes and the jaws 22 may be made of varying heights to accommodate semi-round buttons, for instance. While it is satisfactory to form the cage 14 from a resilient metal wire, it is possible that plastic material may be used.

Figure 8:
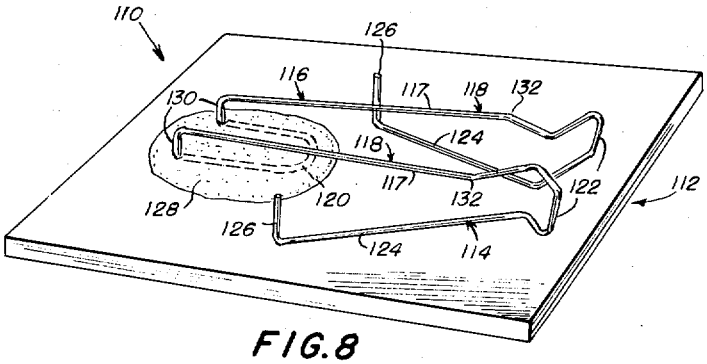
FIG. 8 is a perspective view of a modified form embodying the invention taken from the bottom and slightly to one side.
Figure 9:
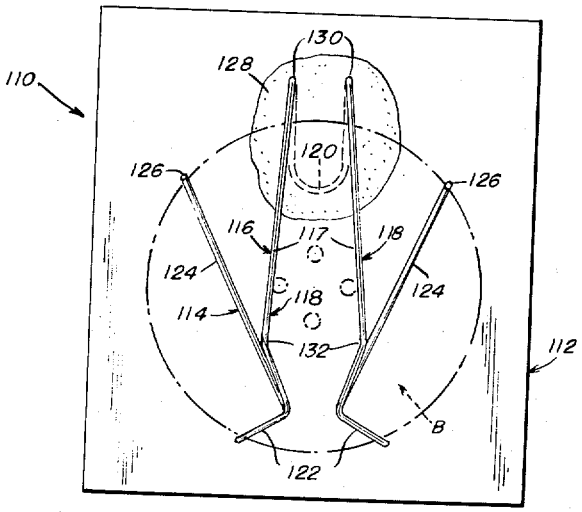
FIG. 9 is a bottom plan view of a modified form embodying the invention showing a button in broken lines.
Figure 10:
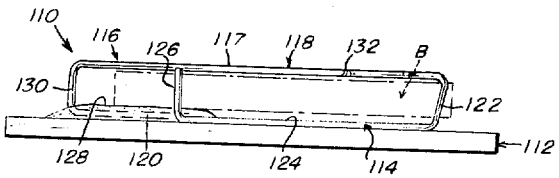
FIG. 10 is a side elevational view of a modified form embodying the invention.

FIGS. 8 through 10 show another embodiment of my invention. The reference numbers of FIGS. 1–5 have been increased by a hundred and applied to corresponding parts of the form of the invention shown in FIGS. 8–10.

In the modified form, the cage 114 is substantially the same as the earlier embodiment except the legs 118 of the U-shaped member 116 are bent upward into a perpendicular run 130 and then forward in a first or parallel run 117 so that the bight of the U-shaped member lies substantially in the same plane with the arms 124. As in the first embodiment, the cage 114 in the second embodiment is secured to the cover 112 at the bight 120. The cage 114 is, therefore, inverted with respect to the cage 14 in its relation to the cover member. Also, to avoid interference with the buttonthread, the legs 118 of the second embodiment may be bowed outwardly as at 132 intermediate the ends of the first or parallel run 117.

The benefit of the second embodiment will be apparent. It has been found that if the cage wire is of thin gauge the fingers 26 of the first embodiment may yield laterally under unusual stress on the button 8 to permit the button to escape rearwardly out of the cage. This escape is precluded in the second embodiment. Should the fingers 126 yield under a lateral strain on the button, the edge of the button will come into abutment with the perpendicular runs 130 blocking escape. Upon relief of the strain, the resilience of the arms 124 urging the fingers inwardly will return the button to its proper position in the cage.

*In fact, in this embodiment of the invention the fingers or stops 126 may be dispensed with entirely. Sufficient gripping action is afforded by the C-shaped jaws 122 and by the action of the legs 118 and arms 124.*

It is thus seen that I have invented an ornamental buttoncover which holds the button in compressive engagement. The cover may be removed from the button by lateral relative movement in one direction only and, hence, the possibility of accidental loss is minimized. It may also be seen that a buttoncover embodying my invention places no stress on and does not depend for positioning on the buttonthread.

While my invention has been shown in a limited number of forms, it is obvious to those skilled in the art that it is not so limited but is susceptible of various changes and modifications without departing from the spirit and claims of the invention.

I claim:

1. A buttoncover comprising in combination an ornamental cover member and a resilient button-receiving cage, said cage including a pair of side-by-side legs each having ends firmly secured to said cover member and each having a first laterally flexible run generally extending in a first direction parallel to said cover member, a pair of C-shaped jaws disposed in mutually confronting relation, said jaws attached respectively to the distal ends of said legs, both jaws extending generally in a second direction perpendicular to said first direction, said jaws forming a spreadable mouth, a pair of arms attached respectively to the ends of said C-shaped jaws opposite the ends attached to the legs, said arms extending rearwardly in relation to said first direction and outwardly, and button stop members connected to the distal ends of said arms respectively and extending in a third direction opposite said second direction.

2. A buttoncover as described in claim 1 in which said legs each include intermediate the end firmly secured to said cover member and said first run, a perpendicular run extending perpendicularly away from said cover member and said second direction is toward said cover member.

3. A buttoncover as described in claim 1 in which said legs are connected at their respective ends attached to the cover member by a bight portion.

4. A buttoncover as described in claim 1 wherein intermediate the ends of the first run the legs are bowed outwardly.

5. In an ornamental buttoncover a resilient button-receiving cage including a U-shaped member comprising a pair of legs and a connecting bight, a pair of C-shaped jaws disposed in mutually confronting relation and forming a spreadable mouth, both jaws being disposed in a plane substantially perpendicular to the plane of said U-shaped member, the lower ends of said C-shaped jaws attached respectively to the outer ends of said U-shaped member, a pair of arms attached respectively to the upper ends of said C-shaped jaws and extending rearwardly and slightly outwardly, button stop members connected to the distal ends of said arms respectively and an ornamental cover member firmly secured to said U-shaped member at the bight thereof.

6. In an ornamental buttoncover a resilient button-receiving cage including a U-shaped member comprising a pair of legs and a connecting bight, a pair of C-shaped jaws disposed in mutually confronting relation and forming a spreadable mouth, both jaws being disposed in a plane substantially perpendicular to the plane of said U-shaped member, the lower ends of said C-shaped jaws attached respectively to the outer ends of said U-shaped member, a pair of arms attached respectively to the upper ends of said C-shaped jaws and extending rearwardly and slightly outwardly, each arm having a depending finger attached to the distal end thereof; and an ornamental cover member firmly secured to said U-shaped member at the bight thereof.

*7. A buttoncover comprising in combination an ornamental cover member and a resilient button-receiving cage, said cage including a pair of side-by-side legs each having ends firmly secured to said cover member and each having a first laterally flexible run generally extending in a first direction parallel to said cover member and spaced-apart therefrom, a pair of C-shaped jaws disposed in mutually confronting relation, said jaws attached respectively to the distal ends of said legs, both jaws extending generally in a second direction perpendicular to said first direction, said jaws forming a spreadable mouth, and a pair of arms attached respectively to the ends of said C-shaped jaws opposite the ends attached to the legs, said arms extending rearwardly in relation to said first direction and outwardly.*

References Cited in the file of this patent or the original patent

UNITED STATES PATENTS

| | | |
|---|---|---|
| 2,850,779 | Dobro | Sept. 9, 1958 |
| 2,906,045 | Stein | Sept. 29, 1959 |
| 2,924,037 | Patrick | Feb. 9, 1960 |